(12) United States Patent
Kibayashi et al.

(10) Patent No.: US 6,345,905 B1
(45) Date of Patent: Feb. 12, 2002

(54) VEHICULAR LAMP HAVING IMPROVED REFLECTOR TILTING DEVICE

(75) Inventors: Michinobu Kibayashi; Hiroshi Shida; Katutami Oishi, all of Shimizu (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/593,157

(22) Filed: Jun. 14, 2000

(30) Foreign Application Priority Data

Jun. 14, 1999 (JP) ............................................ 11-166273

(51) Int. Cl.7 ................................................. B60Q 1/00
(52) U.S. Cl. ........................ 362/464; 362/460; 362/465; 362/469; 362/475; 362/515; 362/528
(58) Field of Search ................................ 362/475, 469, 362/465, 460, 515, 528

(56) References Cited

U.S. PATENT DOCUMENTS 5,993,033 A * 11/1999 Sugimoto et al. ........... 362/515

\* cited by examiner

Primary Examiner—Sandra O'Shea
Assistant Examiner—Bertrand Zeade
(74) Attorney, Agent, or Firm—Sughrue Mion, PLLC

(57) ABSTRACT

A vehicular lamp in which a spherical leading end portion of a tilting actuator is prevented from dropping out of a reflector-side groove-type ball bearing body in a reflector tilting device for tilting a reflector mounted within a lamp body. A reflector tilting device capable of tiltably adjusting a reflector contained in a lamp body includes a tilting actuator disposed in the lamp body having an actuator rod displaceable in the direction of the optical axis of the reflector. A groove-type ball bearing body is mounted to the reflector and fitted into a spherical leading end portion disposed at a leading end of the actuator rod. The groove-type ball bearing body has, at each end of a groove portion which has opposed open ends and into which the spherical leading end portion is fitted, a dropout-preventing strip portion protruding towards the interior of the groove portion. Even if the spherical leading end portion is displaced to either end of the groove portion, the dropout-preventing strip portions prevent the spherical leading end portion from dropping from the groove-type ball bearing body.

6 Claims, 7 Drawing Sheets

VEHICULAR LAMP HAVING IMPROVED REFLECTOR TILTING DEVICE

FIELD OF THE INVENTION

The present invention relates to a vehicular lamp which includes a lamp body in which is mounted a reflector holding a light source, and which permits adjustment of the angle of the optical axis of the lamp by tilting the reflector.

BACKGROUND OF THE INVENTION

A headlamp used in vehicles such as automobiles generally is provided with an aiming adjustment mechanism for adjusting the optical axis of a reflector mounted within a lamp body by vertically and laterally tilting the reflector. Headlamps used in some vehicles have a mechanism for automatic leveling the optical axis of the headlamp so that the optical axis is maintained at a predetermined angle relative to the road surface despite tilting motion of the vehicle. In either case the angular adjustment of the optical axis requires the provision of a reflector tilting device capable of tilting either the entire lamp or a reflector disposed within a lamp body.

A reflector tilting device in the case of a lamp in which only the reflector is tilted may be designed such that the reflector is supported on at least one fulcrum so as to be tiltable with respect to the lamp body along a direction required for the adjustment of the optical axis, for example, vertically or laterally. A tilting actuator is disposed at a location other than the fulcrum to displace the reflector along the direction in which it is tiltable. Thereby the reflector is displaced in a required direction so that the aiming angle thereof is adjusted.

In the construction wherein the tilting actuator displaces the reflector, the tilting actuator undergoes a rectilinear motion while the reflector is rotated about the fulcrum. It is necessary in such a case to employ, at the location where the tilting actuator is coupled to the reflector, a connection structure that hinders neither the rectilinear motion of the tilting actuator nor the rotational motion of the reflector. For such a connection structure there has conventionally been employed a ball bearing body in the shape of a groove (hereinafter referred to as a groove-type ball bearing body). FIG. 7 illustrates the overall structure of such a groove-type ball bearing body.

Referring to FIG. 7, a reflector 3 contained in a lamp body 1 can vertically be tilted on a fulcrum (not shown), and a tilting actuator 31 is secured to the lamp body 1 at a location facing the rear surface of the reflector 3. An actuator rod 32 having at its leading end a spherical leading end portion 33 protrudes from the tilting actuator 31 in the direction of the optical axis of the lamp. The tilting actuator 31 is designed to reciprocally displace the actuator rod 32 in the direction of protrusion when driven. A stem 3b protrudes integrally from the rear surface of the reflector 3 at a location facing the actuator rod 32. A groove-type ball bearing body 21A is secured to a leading end of the stem 3b by a screw 7.

As is apparent from the enlarged perspective view in FIG. 8A, the groove-type ball bearing body 21A, which is plastic-molded, has a semicylindrical groove portion 22, a pair of engagement strip portions 23, and stationary portions 25. The engagement strip portions 23 are formed to protrude on opposed sides along the direction of the groove of the groove portion 22 and have leading end strips 24 bent at an acute angle towards the groove portion 22. The stationary portions 25 protrude outwardly from bases of the engagement strip portions 23. Using small holes 26 formed in the stationary portions 25, the groove-type ball bearing body 21A is secured to the reflector 3 by the screw 7 so that the opening side of the groove portion 22 is directed towards the tilting actuator 31. As is apparent from the longitudinal sectional view in FIG. 8B, the spherical leading end portion 33 of the actuator rod 32 is fitted in a gap formed between the groove portion 22 and the leading end strips 24 of a pair of the engagement strip portions 23. In this state, the inner bottom surface of the groove portion 22 and a pair of the leading end strips 24 abut the spherical surface of the spherical leading end portion 33, and the spherical leading end portion 33 is supported at those abutment points in such a manner as to allow spherical motion.

In this structure, since the groove portion 22 and the engagement strip portions 23 are constant in sectional shape along the direction of the groove, the spherical leading end portion 33 is provided with a degree of freedom in moving in the direction of the groove. Accordingly, if the actuator rod 32 is reciprocally displaced by the tilting actuator 31 in the direction of the optical axis, the groove-type ball bearing body 21A secured to the reflector 3 is displaced in the direction of the optical axis in accordance with the displacement of the spherical leading end portion 33. Since the spherical leading end portion 33 has a margin formed in the direction of the groove of the groove portion 22, the reflector 3 is tiltable with respect to the actuator rod 32 in a required direction, vertically in this case.

The groove-type ball bearing body 21A is plastic-molded as described above and designed such that the molding die is drafted in the direction of the groove of the groove portion 22. Therefore the groove portion 22 and the engagement strip portions 23 are constant in sectional shape along the direction of the groove. Also, the groove portion 22 has opposed open ends. Hence, if the reflector 3 has been tilted greatly, that is, if the spherical leading end portion 33 has been tilted to a large angular position relative to the groove-type ball bearing body 21A, there is a concern, as illustrated in FIG. 8C, that the spherical leading end portion 33 might slide to one open end of the groove portion 22, be removed through the gap between the groove portion 22 and the engagement strip portions 23, and drop from the groove-type ball bearing body 21A. If the spherical leading end portion 33 has been disengaged in this manner, the reflector cannot thereafter be tilted, which makes the automatic leveling adjustment of the optical axis impossible.

Also, the spherical leading end portion 33 tends to drop from the groove-type ball bearing body 21A when the actuator is removed from the lamp body during assembly of or maintenance on the actuator. Once the spherical leading end portion 33 has dropped from the groove-type ball bearing body 21A, it becomes difficult to fit the spherical leading end portion into the groove-type ball bearing body from the side of the actuator. This causes a problem of deterioration in workability.

SUMMARY OF THE INVENTION

It is an object of the present invention to provide a vehicular lamp having a reflector tilting device which prevents a spherical leading end portion of a tilting actuator from dropping out of a reflector-side groove-type ball bearing body.

In accordance with this and other objects, the invention provides a vehicular lamp in which a reflector tilting device capable of tilting a reflector mounted in a lamp body includes a tilting actuator disposed in the lamp body and having an actuator rod displacable along the direction of the optical axis of the reflector and a groove-type ball bearing body mounted to the reflector and fitted to a spherical leading end portion provided at a leading end of the actuator rod. The groove-type ball bearing body has a groove portion which has two open ends and into which the spherical leading end portion is fitted, an engagement strip portion disposed to cover the groove portion from either side and engaging the spherical leading end portion on a front side of the groove portion, and a dropout-preventing portion formed at either side of the groove portion protruding towards the interior of the groove portion and preventing the spherical leading end portion from dropping from either open end of the groove portion.

In this construction, a pair of engagement strip portions are provided facing each other on opposed sides along the direction of the groove of the groove portion, and the respective engagement strip portions have leading end strips supported at one end and folded back towards the groove portion. The respective leading end strips are wedge-shaped so that the distance therebetween gradually decreases towards the groove portion. Further, the dropout-preventing strip portions provided at opposed ends in the direction of the groove of the groove portion are provided at opposed locations of the groove portion and do not cross the direction of the groove portion. The spherical leading end portion may be provided with a precut portion corresponding in shape to a part of the dropout-preventing strip portion protruding into the groove, and the spherical leading end portion can be inserted into the groove portion with the precut portion facing the dropout-preventing strip portion.

In accordance with the present invention, even in the case where the reflector is tilted greatly or the actuator rod forms a large angle with respect to the reflector, for example, when removing the tilting actuator, to such an extent that the spherical leading end portion is displaced to one of the ends of the groove portion of the groove-type ball bearing body, the spherical leading end portion is prevented from dropping from either open end of the groove portion. As a result, the actuator rod remains fitted to the reflector, and the tilting motion of the reflector is ensured.

DESCRIPTION OF THE PREFERRED EMBODIMENTS

Preferred embodiments of the present invention now will be described with reference to the drawings.

Figure 1:
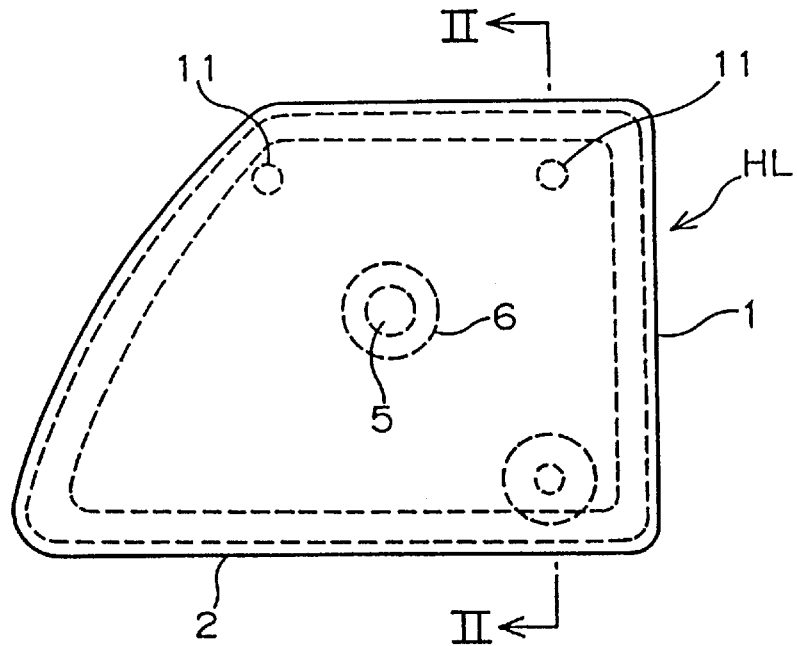
FIG. 1 is a front view of a vehicular lamp constructed according to a first embodiment of the present invention.
Figure 2:
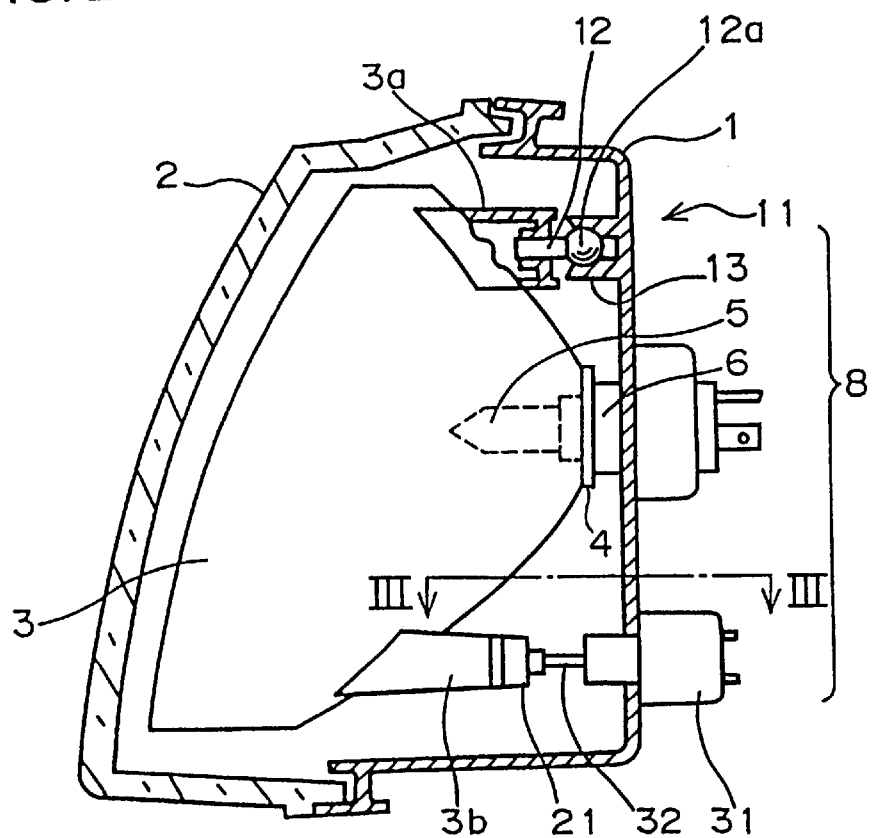
FIG. 2 is a sectional view taken along a line II—II shown in FIG. 1
Figure 3:
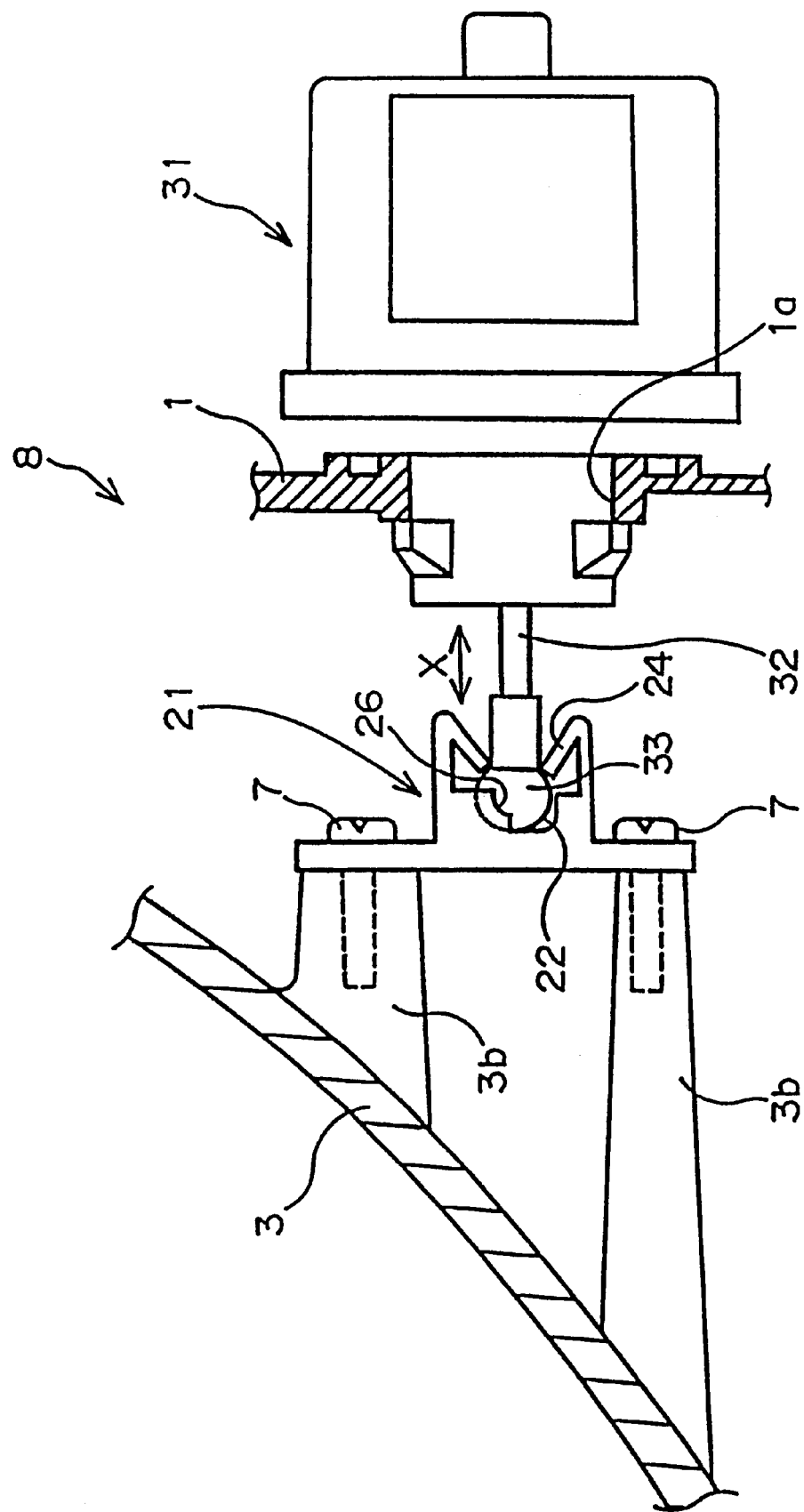
FIG. 3 is an enlarged plan view taken along a line III—III shown in FIG. 2.

FIG. 1 is a front view in which a reflector tilting device constructed in accordance with a first embodiment of the present invention is applied to a vehicular headlamp. FIG. 2 is a sectional view taken along a line II—II shown in FIG. 1. FIG. 3 is an enlarged plan view as viewed from a line III—III shown in FIG. 2. A lens 2 is tightly fitted to a peripheral edge portion of a front opening of a lamp body 1 of a headlamp HL. The lamp body 1 and the lens 2 define a lighting chamber. The lighting contains a plastic-molded reflector 3 whose inner surface is designed as a reflecting surface in the form of a paraboloid of revolution. A bulb mounting hole 4 is formed in a central portion of the reflector 3. A bulb socket 6 supporting a bulb 5 as a light source is removably fitted to the bulb mounting hole 4. In addition, a reflector tilting device 8 is provided to adjust the optical axis of the lamp by vertically tilting the reflector 3.

The reflector tilting device 8 now will be described. The lamp body 1 supports the reflector 3 by pivot mechanisms 11 at two locations, that is, left and right locations in the upper section of a rear surface of the reflector 3. Each of the pivot mechanisms 11 is composed of a ball shaft 12 press-fitted into and supported by a leading end portion of an upper stem 3a protruding rearward from the left or right location in the upper section of the rear surface of the reflector 3, and of a ball bearing 13 having a spherical and cotyloid interior and formed on part of the inner surface of the lamp body 1 facing the ball shaft 12. A spherical leading end portion 12a of the ball shaft 12 is fitted into the ball bearing 13. The reflector 3 can be tilted vertically upon the ball bearing 13 and the ball shaft 12.

Two lower stems 3b protrude rearward generally parallel to each other from one side of a lower section of the rear surface of the reflector 3. A groove-type ball bearing body 21 is secured to a leading end portion of each of the lower stems 3b by a screw 7. The rear surface of the lamp body 1 facing the groove-type ball bearing body 21 is fitted with a tilting actuator 31 which confronts an opening 1a. A generally spherical leading end portion 33 of an actuator rod 32 protruding from the tilting actuator 31 towards the interior of the lamp body 1 is fitted into the groove-type spherical bearing. A drive motor and a worm-wheel mechanism driven by the drive motor are also provided in the tilting actuator 31, although these components are not shown in the drawings and will not be described in detail.

Upon being rotationally driven by the drive motor, the worm-wheel mechanism reciprocally displaces the actuator rod lengthwise. An external control circuit (not shown) controls the operation of the tilting actuator 31. In this embodiment, the control circuit performs control based on an output from a leveling detector for detecting the degree of horizontality of the vehicle body so that the optical axis of the headlamp forms a predetermined angle with respect to the road.

Figure 4A:
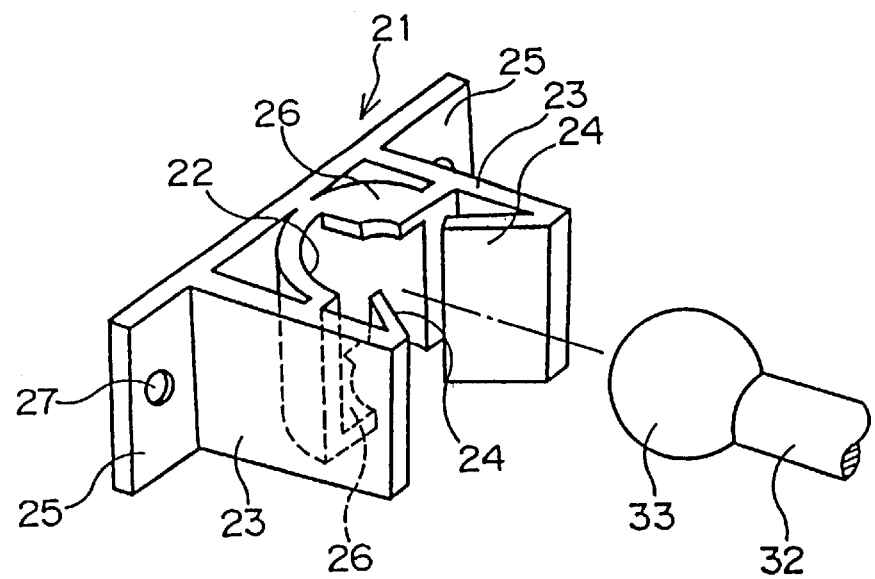
FIGS. 4A, 4B and 4C respectively show a groove-type ball bearing body in a perspective view, a plan view, and a sectional view taken along a line IV—IV of FIG. 4B.
Figure 4B:
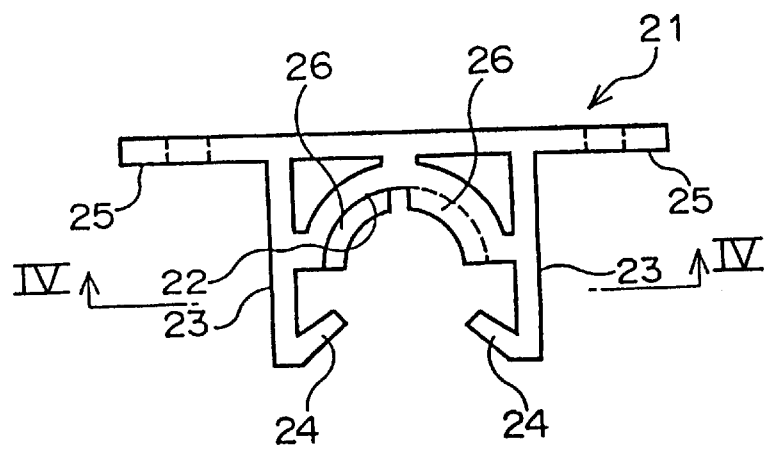
Figure 4C:
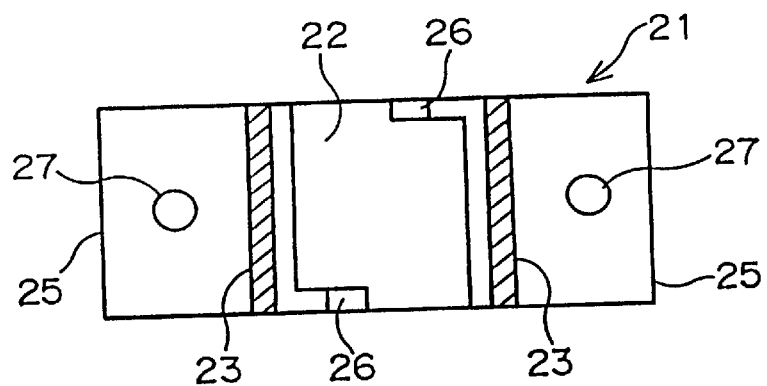

On the other hand, as is apparent from the exterior perspective view in FIG. 4A, the plan view in FIG. 4B, and the sectional view in FIG. 4C taken along a line IV—IV, the groove-type ball bearing body 21 is basically constructed in the same manner as in the conventional art. The groove-type ball bearing body 21 is plastic-molded and has a semicylindrical groove portion 22, a pair of engagement strip portions 23, and stationary portions 25. The groove portion 22 has an inner diameter approximately equal to the diameter of the spherical leading end portion 33 of the actuator rod 32. The engagement strip portions 23 are formed so as to protrude towards the opening of the groove portion 22 on its opposed sides extending along the groove and have leading end strips 24 bent like a sharp edge towards the groove portion 22. The stationary portions 25 protrude outwardly from base portions of the engagement strip portions 23 on opposed sides of the groove portion 22. Dropout-preventing arcuate strip portions 26 protruding towards the interior of the groove portion 22 from opposed sides are integrally formed at opposed ends in the direction of the groove of the groove portion 22. That is, the groove-type ball bearing body 21 defines the draft direction of a molding die along the direction of the groove portion 22. That is, the groove-type ball bearing body 21 defines the draft direction of a molding die along the direction of the groove of the groove portion 22. Thus, the groove portion 22, the engagement strip portions 23 and the stationary portions 25 have a single sectional shape along the direction of the groove of the groove portion 22. In order for the molding die to be drafted at the time of separation, the dropout-preventing strip portions 26 are provided at opposed sides of the groove portion 22 so as not to cross the draft direction of the molding die.

Figure 5A:
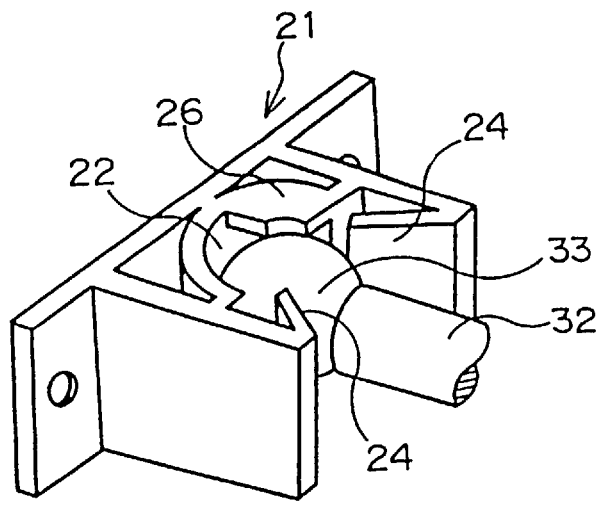
FIG. 5A, 5B and 5C illustrate a state where a spherical leading end portion is fitted in the groove-type ball bearing body in, respectively, a perspective view, a sectional view taken along a line V—V of FIG. 5B, and similar sectional view for an explanation of operation.
Figure 5B:
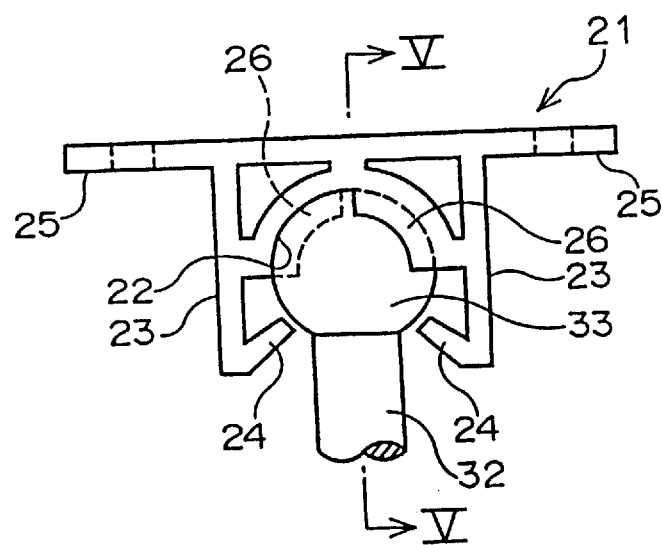
Figure 5C:
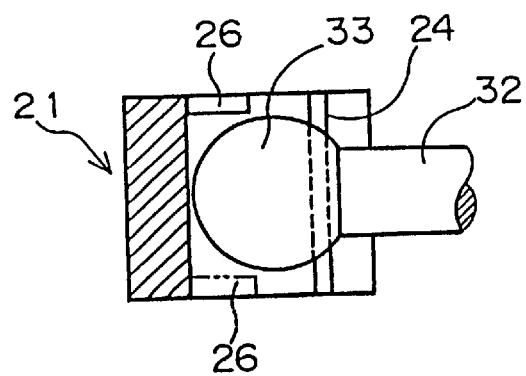

Using small holes 27 formed in the stationary portions 25, the groove-type ball bearing body 21 is secured to the lower stem 3b of the reflector 3 by the screw 7 as described above so that the opening of the groove portion 22 is directed towards the tilting actuator 31. As is apparent from the perspective view in FIG. 5A and the sectional view in FIG. 5B taken along a line V—V, the spherical leading end portion 33 of the actuator rod 32 is fitted into a gap formed between the groove portion 22 and the leading end strips 24 of the engagement strip portions 23. During the fitting operation, if the spherical leading end portion 33 is displaced directly from the front opening of the groove portion 22, the spherical leading end portion 33 comes into abutment with outer surfaces of the leading end strips 24. Then the spherical leading end portion 33 continues to move while elastically deforming the leading end strips 24 inwardly. After passing beyond the leading end strips 24, the spherical leading end portion 33 is fitted into the gap. Being fitted in the gap, the spherical leading end portion 33 abuts at a plurality of locations on its spherical surface with the inner bottom surface of the groove portion 22 and leading edges of the leading end strips 24. The spherical leading end portion 33 is journal-supported at those locations in such a manner as to permit spherical motion.

Because the groove portion 22 and the engagement strip portions 23 are constant in sectional shape along the direction of the groove, the spherical leading end portion 33 is provided with a degree of freedom in movement in the direction of the groove. The dropout-preventing strip portions 26 prevent the spherical leading end portion 33 from being drawn out forwardly. Also, since the dropout-preventing strip portions 26 protrude towards the interior of the groove portion 22, the dropout-preventing strip portions 26 prevent the spherical leading end portion 33 from dropping from the groove portion 22 on either side in the direction of the groove.

In the reflector tilting device 8 thus constructed, when the tilting actuator 31 is driven by a control signal from the control circuit, the actuator rod 32 is displaced in the direction of the optical axis of the lamp, that is, in the direction X shown in FIG. 3. Then the groove-type ball bearing body 21 secured to the reflector 3 is displaced in the direction of the optical axis together with the spherical leading end portion 33 of the actuator rod 32, whereby the reflector 3 is tilted vertically upon the pivot mechanisms 11. Because of the margin formed in the direction of the groove of the groove portion 22 of the groove-type ball bearing body 21, the spherical leading end portion 33 permits the reflector 3 to be vertically displaced relative to the actuator rod 32. The reflector 3 is vertically tilted by rectilinear reciprocal motion of the actuator rod 32. This makes it possible to maintain the optical axis of the headlamp HL at a predetermined angle with respect to the road irrespective of tilting motion of the vehicle body.

Figure 8A:
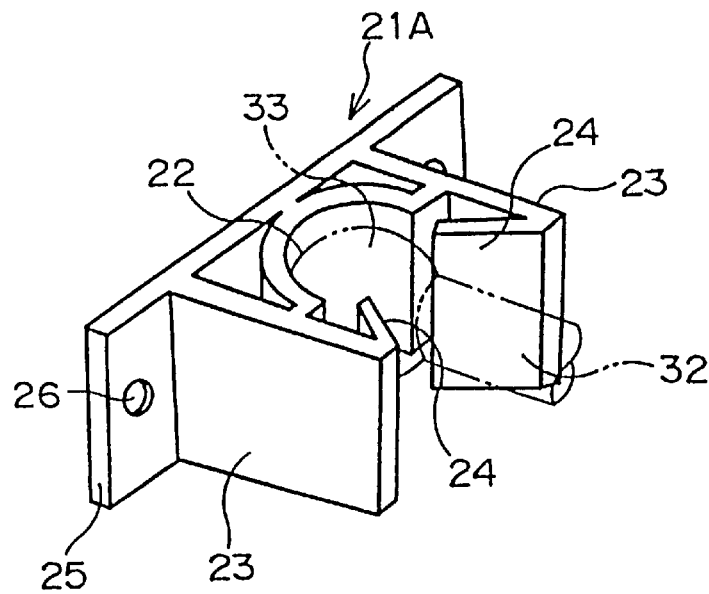
FIGS. 8A, 8B and 8C illustrate a conventional groove-type ball bearing body and its operation respectively in a perspective view and two sectional views.
Figure 8B:
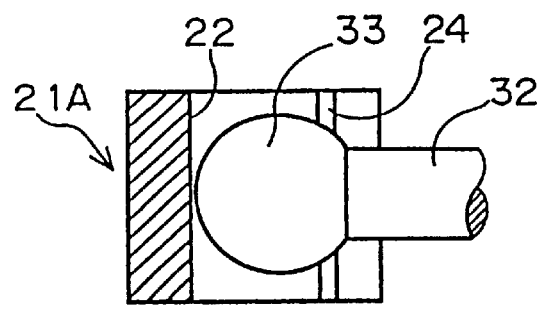
Figure 8C:
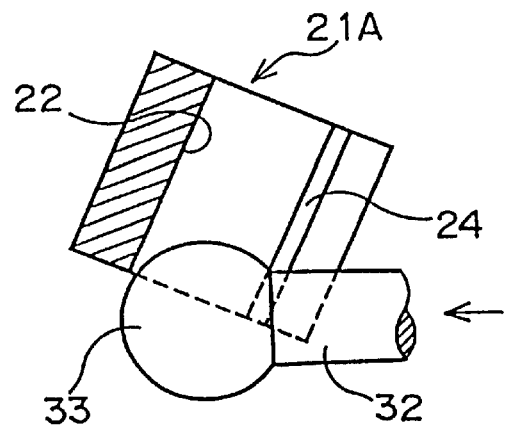

In this reflector tilting device 8, when the reflector 3 is tilted to a large extent, that is, when the spherical leading end portion is tilted to a large angular position relative to the groove-type ball bearing body, the spherical leading end portion 33 slides to one of the end positions in the direction of the groove of the groove portion 22 as shown in FIG. 8C. However, at the end positions of the groove portion 22, the dropout-preventing strip portions 26 are formed to protrude towards the interior of the groove portion 22. Therefore the spherical leading end portion 33 is prevented from dropping from either side of the groove portion 22 by the dropout-preventing strip portions 26. Accordingly, in addition to the case where the aforementioned automatic leveling adjustment of the optical axis is in operation, namely, in the case where the actuator is removed from the lamp body when assembling or providing maintenance on the actuator, the spherical leading end portion 33 remains fitted into the groove-type ball bearing body 21. Thus, unlike the conventional case, it is possible to avoid circumstances where the automatic leveling adjustment of the optical axis becomes inoperable and to prevent a problem of deterioration in workability.

Figure 6A:
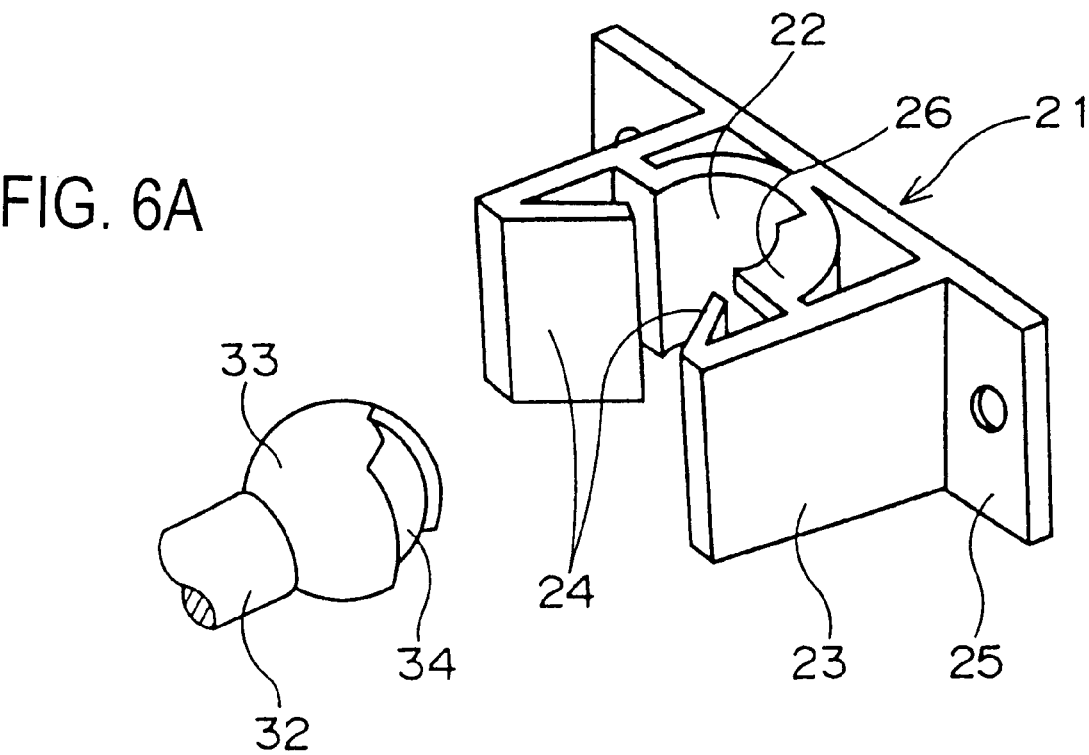
FIGS. 6A and 6B show a groove-type ball bearing body constructed according to a second embodiment of the present invention in a perspective view and a plan view, respectively.

FIG. 6A is a perspective view of an essential part of a second embodiment of the present invention. In the first embodiment, when being fitted into the groove-type ball bearing body 21, the spherical leading end portion 33 proceeds from a location in front of the groove portion 22, that is, from the side of the leading end strips 24 while elastically deforming the leading end strips 24. However, such a fitting operation cannot be performed in some circumstances where the tilting actuator 31 is mounted to the lamp body 1. For this reason, according to the second embodiment, a precut portion 34 is formed in part of the spherical leading end portion 33. The precut portion 34 corresponds in shape to the dropout-preventing strip portions 26 of the groove-type ball bearing body 21. The dropout-preventing strip portions 26 are formed so that their parts protruding from the groove portion 22 generally coincide in shape with the precut portion 34 in the direction of the plane.

Figure 6B:
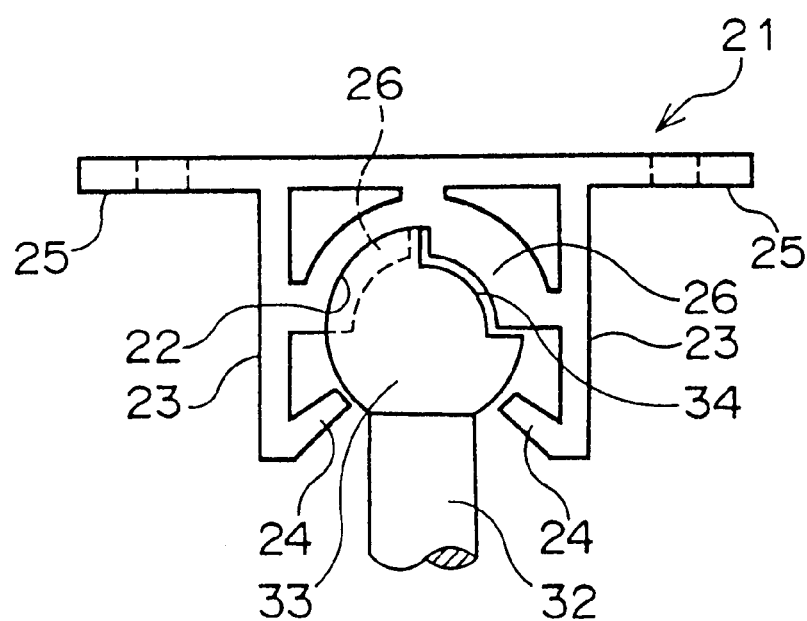
Figure 7:
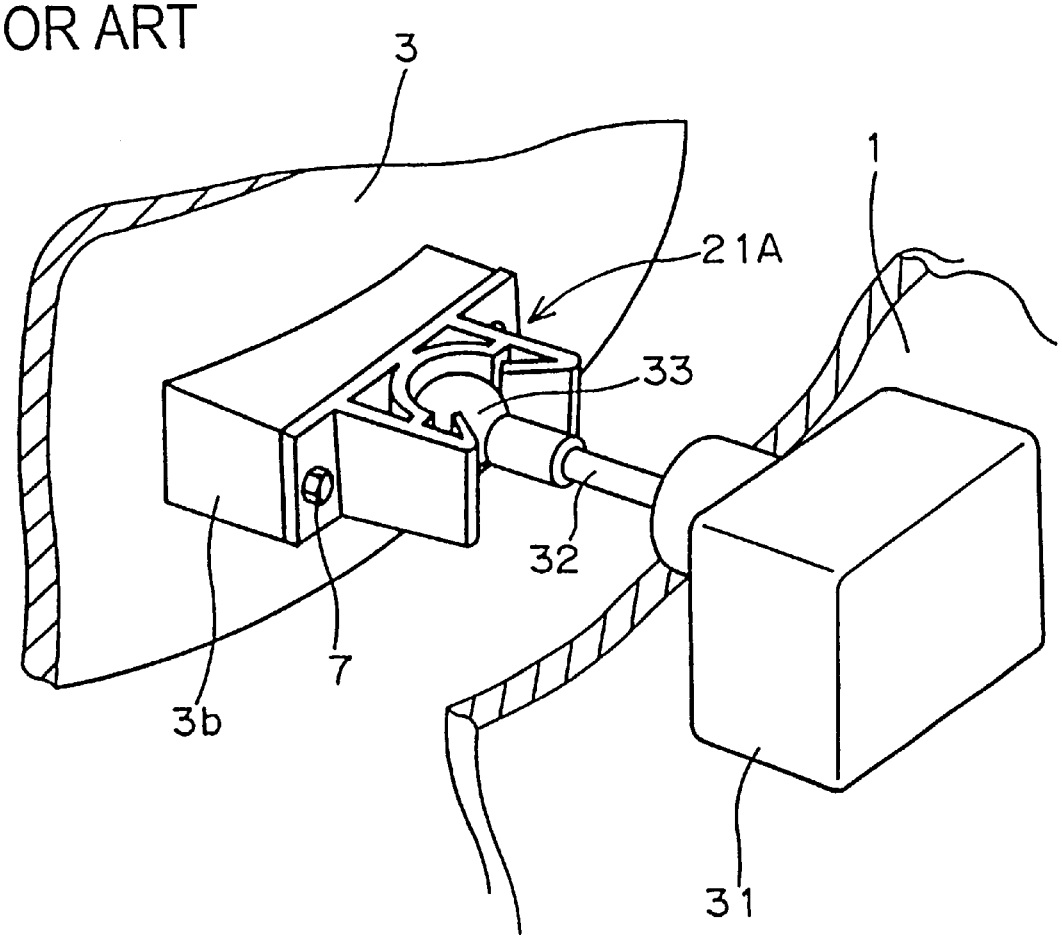
FIG. 7 is a perspective view provided for explaining the conceptual structure of the reflector tilting device.

In the second embodiment, if the precut portion 34 of the spherical leading end portion 33 is directed to face the dropout-preventing strip portions 26 of the groove-type ball bearing body 21 as shown in FIG. 6B, the spherical leading end portion 33 can be fitted into the groove portion 22 from one end of the groove portion 22 of the groove-type ball bearing body 21, for example, from top to bottom of the groove-type ball bearing body 21. Therefore, during the operation of fitting the spherical leading end portion 33 into the groove-type ball bearing body 21, the spherical leading end portion 33 may be press-fitted from a location in front of the groove-type ball bearing body 21 as in the first embodiment or may be inserted from one end of the groove-type ball bearing body 21 as in the second embodiment. Thus, facilitation of the operation of assembling the reflector tilting device is advantageously achieved. In the case where the tilting actuator 31 is directed in the normal direction and mounted on the lamp body 1, the precut portion 34 may be formed in the spherical leading end portion 33 so as not to face the dropout-preventing strip portions 26. In other words, the tilting actuator 31 may be designed to assume its normal position when the spherical leading end portion 33 is pivoted after the insertion into the groove-type ball bearing body 21. Thus, if the spherical leading end portion 33 has slid to one end of the groove portion 22 during the tilting of the reflector 3, the precut portion 34 does not face the dropout-preventing strip portions 26. Consequently, the spherical leading end portion 33 does not drop from the groove-type bearing body 21.

The description of the aforementioned embodiments relates to the case where the present invention is applied to an automatic leveling optical axis adjuster for a headlamp. However, as long as a vehicular lamp including a headlamp has a device for tilting a reflector within a lamp body, a tilting actuator having a spherical leading end portion as in the aforementioned embodiments and driven either automatically or manually, and a groove-type ball bearing body mounted to the reflector, the present invention can also be applied to the vehicular lamp.

According to the present invention which has been described hitherto, the reflector-side groove-type ball bearing body to be fitted to the spherical leading end portion of the actuator rod of the tilting actuator for tilting the reflector is designed to have, at each end of a groove portion which has opposed open ends and into which the spherical leading end portion is fitted, a dropout-preventing strip portion protruding towards the interior of the groove portion, and is adapted to prevent the spherical leading end portion from dropping from either open end of the groove portion. Thus, even in the case where the reflector is tilted greatly or the actuator rod forms a large angle with the reflector, for example, when removing the tilting actuator, to such an extent that the spherical leading end portion is displaced to one of the ends of the groove portion of the groove-type ball bearing body, it is possible to prevent the spherical leading end portion from dropping from either open end of the groove portion. That is, the present invention achieves the effects of ensuring tilting motion of the reflector and facilitating the operations of assembling or providing maintenance on the tilting actuator.

It should further be apparent to those skilled in the art that various changes in form and detail of the invention as shown and described above may be made. It is intended that such changes be included within the spirit and scope of the claims appended hereto.

What is claimed is:

1. A vehicular lamp including a lamp body, a reflector mounted in said lamp body, a light source mounted on said reflector, and a reflector tilting device permitting said reflector to tilt with respect to the lamp body, said reflector tilting device comprising:

a tilting actuator disposed in said lamp body, wherein said tilting actuator includes an actuator rod displaceable in a direction parallel to an optical axis of said reflector, and a groove-type ball bearing body mounted to said reflector and fitted to a spherical leading end portion provided at a leading end of said actuator rod; and said groove-type ball bearing body includes a groove portion having two opposed open ends into which said spherical leading end portion is fitted, a pair of engagement strip portions disposed to cover said groove portion from opposed sides of said groove portion and engaging said spherical leading end portion on a front side of said groove portion, and a pair of dropout-preventing portions formed at said opposed open ends of said groove portion protruding towards an interior of said groove portion and preventing said spherical leading end portion from dropping from either end of said groove portion.

2. The vehicular lamp according to claim 1, wherein said pair of said engagement strip portions are arcuately shaped.

3. The vehicular lamp according to claim 1, wherein:

said pair of said engagement strip portions are provided facing each other on opposed sides along a direction of a groove of said groove portion;

said engagement strip portions have leading end strips supported at one end and are folded back towards said groove portion; and said leading end strips are wedge-shaped so that a distance therebetween gradually decreases towards said groove portion.

4. The vehicular lamp according to claim 1, wherein said dropout-preventing strip portions provided at opposed ends in said direction of said groove of said groove portion are provided at opposed locations of said groove portion and do not cross said direction of said groove portion.

5. The vehicular lamp according to claim 1, wherein:

said spherical leading end portion is provided with a precut portion corresponding in shape to a part of said dropout-preventing strip portion protruding into said groove; and said spherical leading end portion can be inserted into said groove portion with said precut portion facing said dropout-preventing strip portion.

6. The vehicular lamp according to claim 5, wherein said pair of said engagement strip portions are arcuately shaped.

* * * * *